United States Patent
Takeda et al.

(10) Patent No.: US 6,914,391 B2
(45) Date of Patent: Jul. 5, 2005

(54) ILLUMINATING DEVICE

(75) Inventors: Yuji Takeda, Ehime (JP); Masami Takagi, Ehime (JP); Hiroki Nakano, Ehime (JP); Takayoshi Kurita, Ehime (JP); Tomomasa Hirao, Ehime (JP)

(73) Assignee: Harison Toshiba Lighting Corp., Ehime (JP)

( * ) Notice: Subject to any disclaimer, the term of this patent is extended or adjusted under 35 U.S.C. 154(b) by 27 days.

(21) Appl. No.: 10/737,877

(22) Filed: Dec. 18, 2003

(65) Prior Publication Data

US 2004/0125599 A1 Jul. 1, 2004

(30) Foreign Application Priority Data

Dec. 20, 2002 (JP) ........................................ 2002-370768

(51) Int. Cl.[7] .............................................. H05B 37/02
(52) U.S. Cl. ........................ 315/223; 315/224; 315/246
(58) Field of Search ................................ 315/224, 223, 315/246, DIG. 7; 313/493, 634

(56) References Cited

U.S. PATENT DOCUMENTS 5,965,988 A * 10/1999 Vollkommer et al. ....... 315/246
6,710,535 B2 * 3/2004 Versluijs ..................... 313/493

* cited by examiner

*Primary Examiner*—David Vu
(74) *Attorney, Agent, or Firm*—Banner & Witcoff, Ltd.

(57) ABSTRACT

An illuminating device according to an embodiment of the present invention includes a dielectric barrier discharge type low pressure discharge lamp 1 composed of a tubular glass lamp vessel 10, in which mercury and rare gas are enclosed, a first and a second electrode 21,26, which are made of electrically conductive layer, are provided on an outer surface of both ends of the tubular glass lamp vessel 10 and a high frequency power source of a floating output type 81,82, which supplies a sine wave voltage between the first and the second electrodes of the dielectric barrier discharge type low pressure discharge lamp 1 having a neutral point of the sine wave voltage being grounded, and which supplies a frequency in a range from 40 kHz to 100 kHz.

19 Claims, 6 Drawing Sheets

| | LIGHTING WITH SINE WAVE VOLTAGE | | | | LIGHTING WITH SQUARE WAVE VOLTAGE | | | |
|---|---|---|---|---|---|---|---|---|
| FREQUENCY / LAMP POWER CONSUMPTION | 50 [kHz] | 100 [kHz] | 150 [kHz] | 200 [kHz] | 50 [kHz] | 100 [kHz] | 150 [kHz] | 200 [kHz] |
| 3 [W] | 7300 | 7550 | 7700 | 7900 | 5100 | 6500 | 7200 | 7850 |
| 4 [W] | 7650 | 7800 | 7900 | 8000 | 6050 | 7100 | 7700 | 8000 |

ILLUMINATING DEVICE

The present application claims the benefit of priority of Japan Application No. 2002-370768 filed Dec. 20, 2002 which is incorporated by reference.

BACKGROUND TECHNOLOGY OF THE INVENTION

The present invention relates to an illuminating device suited for back light units used for high luminance liquid crystal display device.

As a back light source used for liquid crystal monitor for a personal computer or a liquid crystal TV set that requires high luminance and high efficiency, a cold cathode low pressure discharge lamp is generally used. The cold cathode low-pressure discharge lamp encloses mercury and rare gas as a discharge medium inside a tubular glass lamp vessel. A phosphor layer is formed on the inner wall of the glass lamp vessel, and the cold cathodes are provided in the glass vessel at its both ends. A high frequency sine wave voltage is supplied between the cold cathodes provided by a high frequency power source to light the low-pressure discharge lamp.

Now, a high luminance of 450 cd/m or higher is required for the back light source for liquid crystal TV set. In order to fulfill the requirement, a right under type back light unit is used, in which more than ten lamps are provided right under the light guide plate. When the cold cathode low-pressure discharge lamp is used for this type of back light unit, one inverter, which is a high frequency voltage source, can light only one lamp. Therefore, the inverters of as many as the number of the lamps are necessary, which results in high cost for inverters.

In order to solve the problem, a low cost back light source for liquid crystal TV set has been developed, in which a dielectric barrier discharge type low pressure discharge lamp (called as a dielectric barrier discharge lamp) is provided having outer electrodes made of an electrically conductive layer formed on an outer surface of end portions of the tubular glass lamp vessel.

The dielectric barrier discharge lamp has a phosphor layer on the inner wall of a tubular glass lamp vessel enclosing mercury and rare gas inside and outer electrodes formed on an outer surface of end portions of the glass lamp vessel. With the lamp described, a plurality of lamps can be lighted with one inverter at a time, reducing the cost of inverter in the back light unit.

However, such dielectric barrier discharge lamp enclosed with mercury had the following problems. When the discharge lamp is lighted by an inverter which provides a sine wave voltage having a frequency of 50 KHz at its output terminals with one end of the output terminal being grounded, a corona is discharged from the outer electrode of the lamp connected with the high voltage output terminal of the inverter due to the high lamp voltage exceeding 2000 Vrms and the corona result in generation of ozone.

Further, when such dielectric barrier discharge lamp enclosed with mercury is driven by a square wave voltage, which is used for lighting a dielectric barrier discharge lamp enclosed with xenon and free of mercury, there was a problem that the efficiency became worse compared with the lighting by sine wave voltage.

On the other hand, recently, a so-called narrowed frame picture, which means a display panel having a narrow frame area at a periphery of the picture, is required for liquid crystal display units, in order to make the viewing area in display panel as large as possible. It is required for a structure of the discharge lamp for the back light unit satisfying such demand to make the electrode length shorter on the both ends of the glass tube to make the effective length of the discharge lamp longer.

In general, making the length of the outer electrode of the dielectric discharge lamp short decreases the tube current and thus decreases the luminance of the lamp. Therefore, it is desired to obtain a sufficient tube current even when the outer electrode length is short. There are two measures to overcome this problem. One is to raise the tube voltage; another is to increase the oscillating frequency. The latter of the two is difficult to realize because of the limit in the transformer. Therefore, the former measure of raising the tube voltage has been adopted in the past.

However, for example, to obtain a tube current of 4 mA in the dielectric barrier discharge lamp having a reduced length electrode of 10 mm long, some 1.7 times voltage as high as the voltage must be applied, which voltage is necessary for obtaining 4 mA tube current in a dielectric barrier discharge lamp having an electrode length of 2.0 mm. As the result, the tube voltage exceeds 2000 Vrms, and the problem that ozone is generated from the electrode due to the corona discharge as described above.

Further, it is necessary to raise the tube voltage in order to increase luminance of the discharge lamp, since the oscillating frequency is difficult to increase owing to the characteristic limit of the transformer. Thus the ozone is generated more actively.

As mentioned above, there has been no other means than raising the tube current with increased length of the electrode for the dielectric barrier discharge lamp to increase the luminance of the back light illuminating device. However, this means makes the effective light emitting length shorter and cannot fully meet the demand for the narrow frame picture display.

The present invention has been made to overcome such conventional technical problems and thus it is an object of the present invention to supply an illuminating device, with which a dielectric barrier discharge lamp enclosed with mercury is driven to light under the best conditions.

SUMMARY OF THE INVENTION

The illuminating device according to the present invention includes a dielectric barrier discharge lamp composed of a tubular glass lamp vessel, in which a discharge medium is enclosed, first and second electrodes provided on an outer surface of both ends of the tubular glass lamp vessel, which are made of electrically conductive layer, and a high frequency power source which supplies a sine wave voltage between the first and the second electrodes of the dielectric barrier discharge lamp having a neutral point of the sine wave voltage being grounded, wherein the high frequency sine wave voltage has a frequency in the range from 40 kHz to 100 kHz.

Further, in the illuminating device according to the present invention, a plurality of the dielectric barrier discharge lamps is connected in parallel with the high frequency power source.

Further, in the illuminating device according to the present invention, the high frequency power source is an inverter of floating output type, which outputs a sine wave voltage with the oscillating frequency of 70 to 100 kHz, and the dielectric barrier discharge lamp is driven at a tube voltage of 2000 Vrms or lower.

With the illuminating device according to the present invention, ozone generation due to the corona discharge at the electrodes can be prevented because the dielectric barrier discharge lamp can be operated with a supply voltage of 2000 Vrms or lower.

Besides, in the illuminating device according to the present invention, the dielectric barrier discharge lamp can be operated with a sine wave high frequency voltage having a lower frequency and with higher efficiency compared with the dielectric barrier discharge lamp operated by the square wave AC voltage.

Further, in the illuminating device according to the present invention, the output voltage of the sine wave voltage source is supplied to a plurality of dielectric barrier discharge lamp in parallel through electrode made of electric conductive silicone rubber.

With the illuminating device according to the present invention, the assembling is easy including the connection of a plurality of dielectric barrier discharge lamps with the feeding electrodes of the illuminating device. Moreover, the heat generated at the electrode can be diffused so that local high temperature rise may be prevented.

DETAILED DESCRIPTION OF THE INVENTION

Embodiments according to the present invention will be explained below referring to the figures attached.

Figure 1:
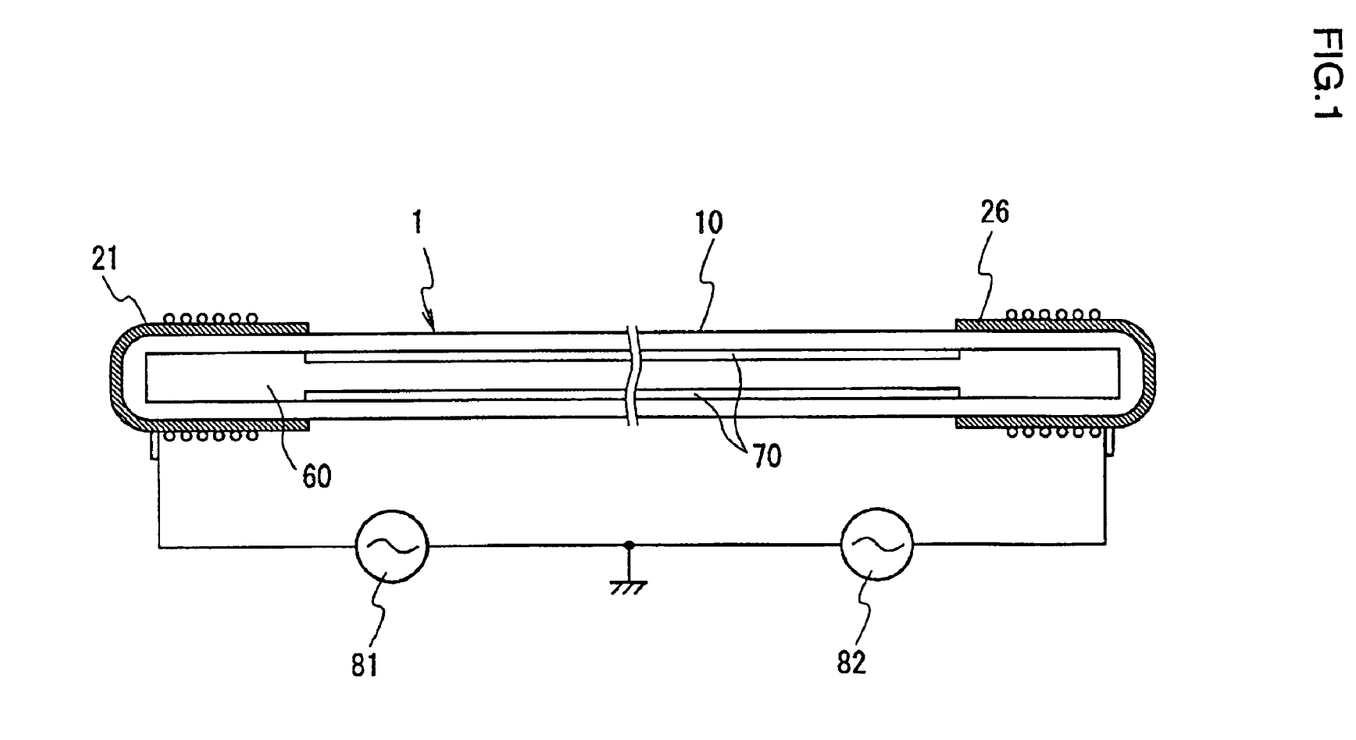
FIG. 1 is a block diagram showing a construction of a illuminating device according to the first embodiment of the present invention.

FIG. 1 shows a construction of the illuminating device according to a first embodiment of the present invention. A dielectric barrier discharge lamp 1 is composed of a tubular glass lamp vessel 10 on the inner wall of which a phosphor layer 70 is formed and mercury and rare gas 60 are enclosed inside. Outer electrodes 21, 22 made of an electrically conductive layer are provided circumferentially on an outer surface of both ends of the glass lamp vessel 10. Specific structure of the dielectric barrier discharge lamp 1 is as follows.

<Tubular Glass Lamp Vessel>
Material: Borosilicate Glass
Dimension: outer diameter; 2.6 mm, inner diameter; 2.0 mm, total length; 397 mm <Outer Electrode>
Material: aluminum foil+electrically conductive silicone adhesive layer,
Length: 17 mm
<Phosphor Layer>
Material: 3-wavelength phosphor.
Thickness: 20 μm
<Filler>
Enclosed gas: mixed gas of neon and argon (composition ratio: neon/argon=90 mol %/10 mol %).
Pressure: 8 kPa.
Mercury: charged amount 3 mg.

A first and second high frequency power sources 81, 82, each of which supply a sine wave voltage having a different phase from each other by 180°, are connected to the outer electrodes 21, 26 of the dielectric barrier discharge lamp 1, respectively. The high frequency power sources 81, 82 are of floating output type power sources, each of which has one end grounded and other end providing a high voltage having a different phase from each other by 180°

Figure 2:
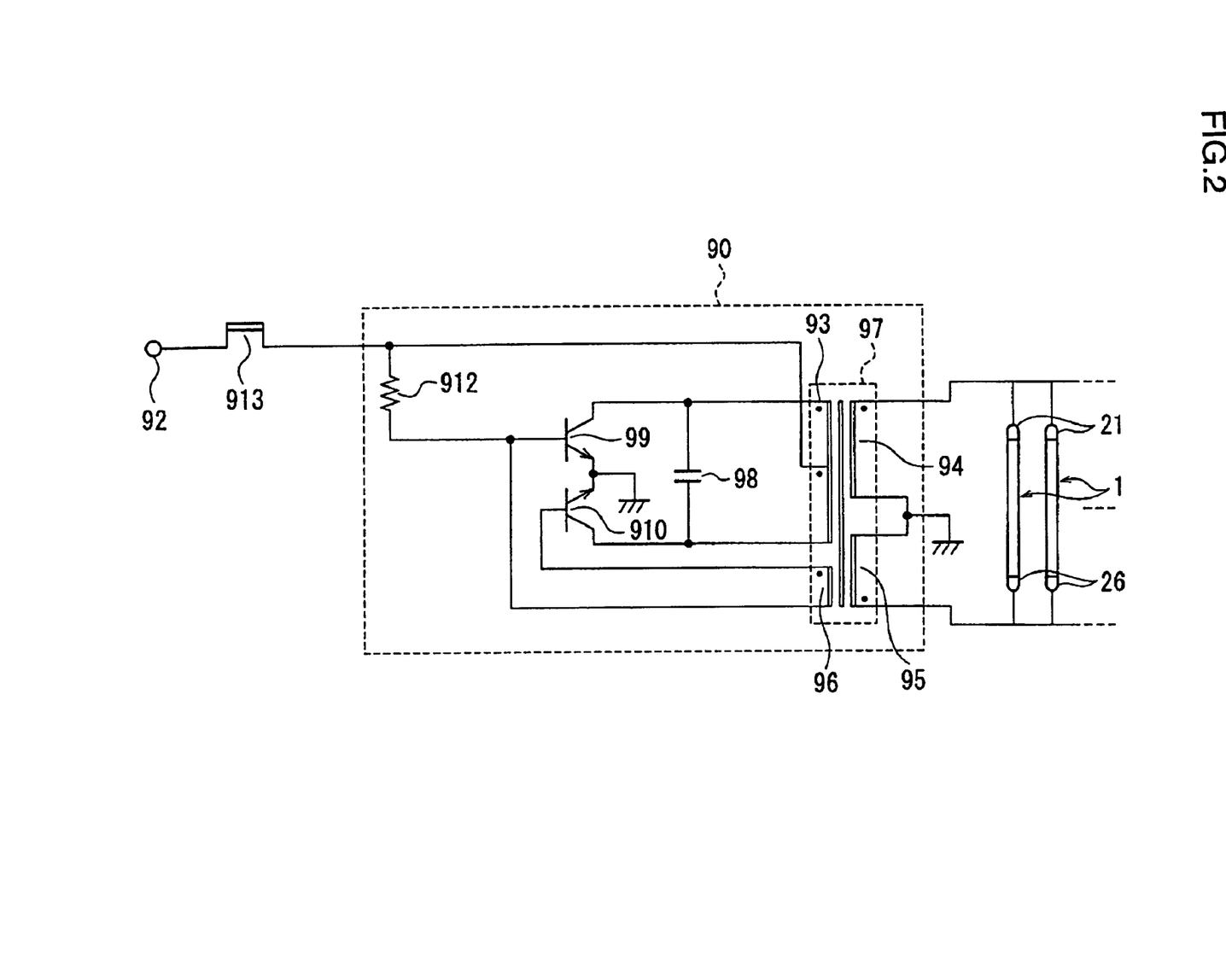
FIG. 2 is a circuit diagram of an inverter circuit composing a high frequency power source used in the above embodiment.

A preferable circuit configuration of the high frequency power source 81, 82 is shown in FIG. 2. It is needless to say that the power source used in the embodiment of the present invention is not limited only to the circuit shown in FIG. 2 but the power sources having other configurations can be used.

The high frequency power source 81, 82 is composed of a resonance Royer type inverter circuit 90. The inverter circuit 90 includes an inverter transformer 97 having a primary winding 93 at an input side, first and second secondary windings 94, 95 at an output side, and a tertiary winding 96 of input side. A capacitor 98 for resonance, which composes a LC resonance circuit with the inductance component of the winding 93, is connected to the primary winding 93 of the inverter transformer 97. Collector electrodes of a pair of transistors 99, 910 are connected to the primary winding 93 of the inverter transformer 97, the emitter electrodes of which are grounded in common. On the other hand, one ends of the first and the second secondary windings 94, 95 of the inverter transformer are grounded in common and the other ends of the windings 94, 95 are connected to the outer electrodes 21, 26 of a plurality of dielectric barrier discharge lamps 1 respectively.

A DC voltage obtained by rectifying the AC power source is supplied to a DC power source terminal 92. The base electrode of the input side transistor 99 of the inverter circuit 90 is connected through a series resistor 912 to the DC power source terminal 92. An intermediate tap of the primary winding 93 of the inverter transformer 97 is connected to the DC power source terminal 92 through a series inductor 913. Inductor 913 is a choke coil, which maintains the input current to the inverter circuit 90 to be constant. The first and the second secondary windings 94, 95 of the inverter transformer 97 have a larger winding ratio than the primary winding 93, so that it may boost the primary side voltage.

The first and the second secondary windings 94, 95 of the inverter transformer 97 have opposite winding directions with each other, so that high frequency sine wave voltages having different phases by 180° with each other are supplied to the outer electrode 21, 26 of the dielectric barrier discharge lamp 1. Consequently the dielectric barrier discharge lamp 1 is driven by high frequency voltages having the phases different from each other by 180°

One end of the tertiary winding 96 provided on the inverter transformer 97 is connected to the base electrode of the transistor 99 and the other end of the tertiary winding 96 is connected to the base electrode of the transistor 910, respectively. With this configuration, the voltage generated in the tertiary winding 96 is fed back to the base electrodes of the transistor 99, 910.

The operation of the inverter circuit 90 thus formed is explained below. When a DC voltage is supplied on the DC power source terminal 92, a current flows in the primary winding 93 of the inverter transformer 97 through inductor 913. This DC voltage is supplied at the same time from the DC power source terminal 92 to the base electrode of the transistor 99 through the resistor 912. In the primary side of the inverter transformer 97, a resonance circuit is formed by the reactance of the primary winding 93, the combined reactance of the tertiary winding 96 and a feed back reactance from the secondary side, and the capacitance of resonance capacitor 98. When resonance occurs in the resonance circuit, a voltage proportional to the winding ratio between the primary winding 93 and the tertiary winding 96 of the inverter transformer 97 is induced between the terminals of the tertiary winding 96 of the inverter transformer 97. A current flows in the tertiary winding 96 of the inverter transformer 97 in the same direction with that flowing in the primary winding 93, and the current is positively fed back to the input side of a pair of transistors 99, 910, thereby a self-excited oscillation being established. At this time, the transistors 99, 910 are turned ON alternately at a resonance frequency of the resonance circuit.

The oscillation frequency at this time is the same as the resonance frequency of the resonance circuit described above. The resonance frequency is determined by the reactance of the primary winding 93 of the inverter transformer 97, the combined reactance of the tertiary winding 96 and the reactance fed back from the secondary side, and the capacitance of the resonance capacitor 98 as described above. A high frequency voltage is generated on the output side of the inverter circuit 90 at this time, which is raised according to the turn ratio of the primary winding 93 and the secondary winding 94, 95 of the inverter transformer 97.

Using the inverter circuit 90 thus composed, high frequency sine wave voltages having the phases difference of 180° from each other, are applied on the outer electrodes 21, 26 of the dielectric barrier discharge lamp 1, which is thus driven in a floating state.

Next, the lamp efficiency is measured when a square wave voltage drives the dielectric barrier discharge lamp 1 and when a sine wave voltage drives it. Here, the lamp efficiency is obtained by the following formula.

Lamp efficiency [cd/(m·W)]=lamp luminance[cd/m]/lamp power consumption [W]

Figure 3:
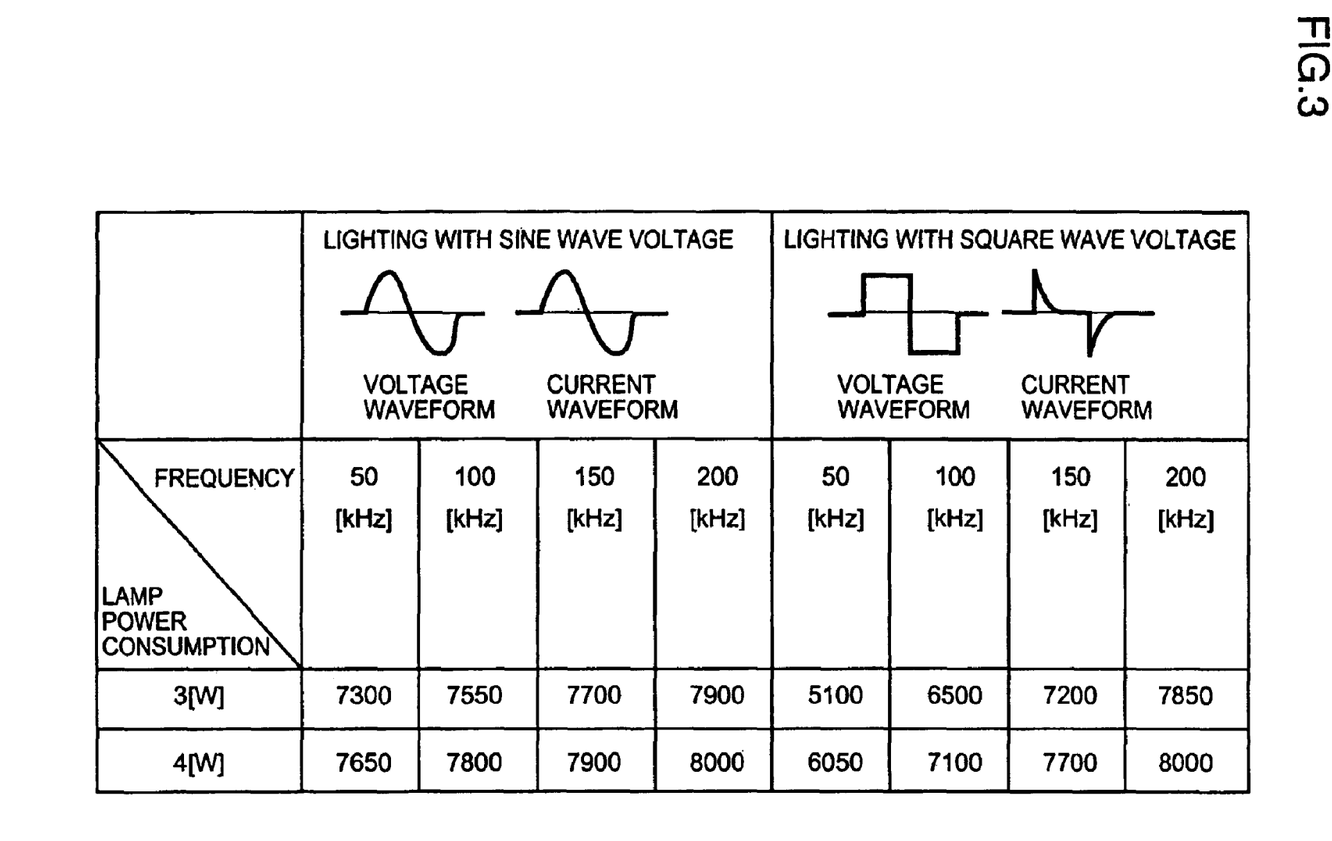
FIG. 3 is a diagram showing an experimental result of a study of a relation between the lighting voltage waveform and the lamp efficiency in the dielectric barrier discharge lamp used in the illuminating device in the first embodiment.

The result measured is shown in Table 1 of FIG. 3.

From the result shown in the Table 1 of FIG. 3, it is confirmed that the lamp efficiency is high when the high frequency sine wave voltage, compared when the high frequency square wave voltage drives it, drives it. However, when the driving frequency is 200 kHz, lamp power consumption is 4 W and the lamp efficiency when driven by square wave voltage was nearly equal to that driven by sine wave voltage. The reason is presumed as follows.

When a square wave voltage is applied to the dielectric barrier discharge lamp 1, a periodic impulse current flows, and thereafter a discharge pause period follows, where a current does not flow. In the case of dielectric barrier discharge lamp enclosed with xenon, the efficiency becomes high when driven by a square wave voltage because there exists a light emission due to an after glow during the discharge pause period right after the impulse current. However, in the case of dielectric barrier discharge lamp enclosed with mercury as in the embodiment according to the present invention, the lamp efficiency becomes low when driven by a square wave voltage, compared with when driven by a sine wave voltage because the light emission scarcely takes place during the discharge pause period.

In the case of lighting with a square wave voltage, the lamp efficiency becomes close to that of lighting with a sine wave voltage if the frequency becomes higher, because the absolute time of discharge pause becomes short when frequency becomes higher. However, if the voltage frequency becomes very high in order to improve the lamp efficiency, the designing of the illuminating device becomes difficult. Therefore, sine wave voltage driving is preferable for the driving voltage waveform, which is high efficiency even in a low frequency.

Figure 4:
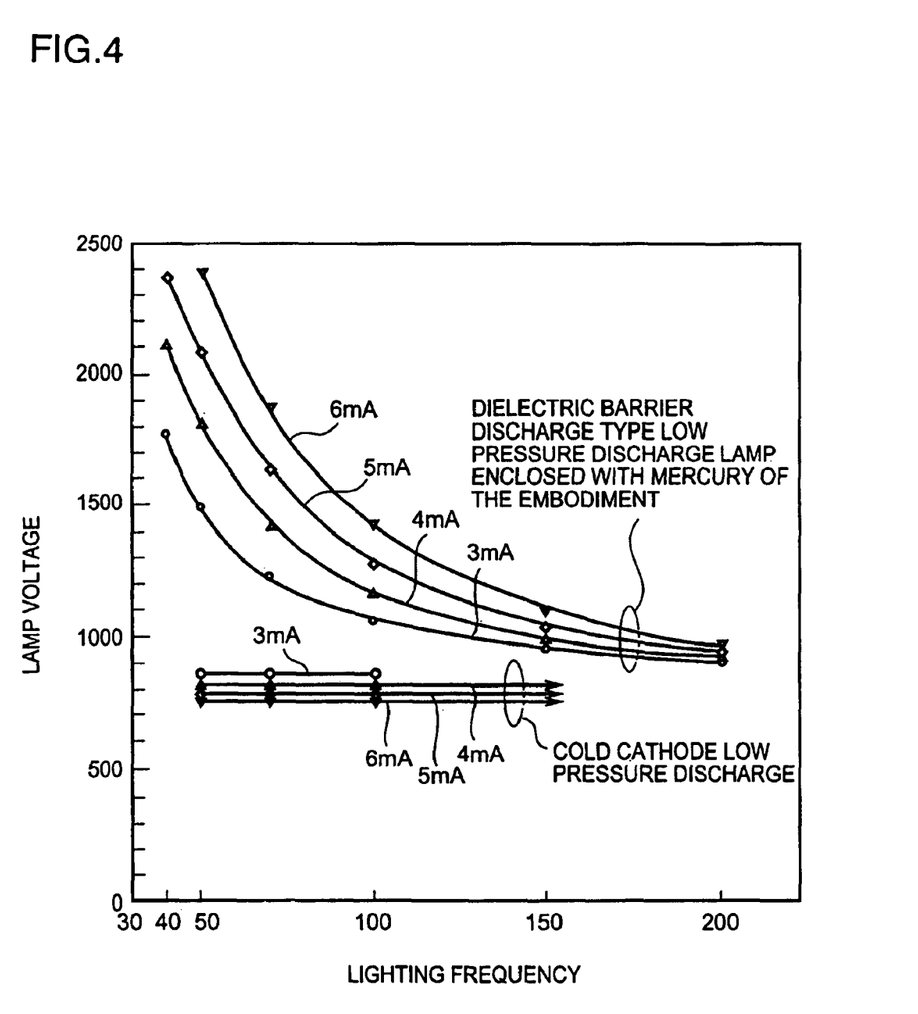
FIG. 4 is a diagram showing an experimental result of a study of a relation between the frequency of the sine wave voltage supplied to the dielectric barrier discharge lamp and the lamp voltage.

Next, the variation of the lamp voltage was measured, under the condition that the tube current of the dielectric barrier discharge lamp 1 enclosed with mercury was kept constant, and the frequency of the sine wave voltage applied between the outer electrodes 21, 26, was varied.

The result is shown in FIG. 4. Observing the graph of FIG. 4, it was confirmed that the lamp voltage of the dielectric barrier discharge lamp 1 decreases as the driving frequency increases and approaches to the lamp voltage of a cold cathode low-pressure discharge lamp. Thus, it is possible to prevent the generation of corona discharge and the generation of the ozone gas because the dielectric barrier discharge lamp 1 according to the embodiment of the present invention is capable to obtain necessary tube current when the driving frequency is high even though the lamp voltage is low.

However, if the driving frequency was more than 100 kHz when the lamp is assembled in a back light illuminating device, leakage current is apt to flow in the surrounding parts and material. Therefore, it is necessary to choose the driving frequency to be lower than 100 kHz.

Besides, from the experimental result of FIG. 4, it became clear that the lamp voltage becomes lower than 2,000 Vrms when the driving frequency was in the range of higher than 40 kHz, while the lamp current was 3 mA. As stated above, when the lamp voltage becomes lower than 2,000 Vrms, corona discharge generation can be prevented and generation of ozone can be prevented in the floating output type inverter used in the embodiment of the present invention, because the voltage difference between the outer electrodes 21, 26 and the ground potential can be made lower than 1,000 Vrms.

On the other hand, because mercury exhaustion phenomenon might occur like a cold cathode low pressure discharge lamp enclosed with mercury, when the driving frequency is chosen at a frequency lower than 30 kHz, it is desirable to make the driving frequency higher than 40 kHz. That is, if the driving frequency is made lower than 30 kHz, the oscillation of the inverter circuit 90 as a high frequency power supply becomes unstable, where the positive and negative waveforms of the sine wave are distorted and become unsymmetrical. For this reason, the quantity of moving mercury ion between the electrodes in the discharge tube becomes different in positive or negative periods, and a mercury exhaustion problem occurs on the side of electrode where the quantity of the mercury movement is smaller.

Taking the above three points into consideration, it is desirable to arrange the driving frequency of the high frequency power source 81, 82 as an illuminating device to be from 40 kHz to 100 kHz for an illuminating device giving no adverse effect on surroundings with a high frequency wave, preventing ozone generation, and prolonging a life of the discharge lamps.

Figure 5:
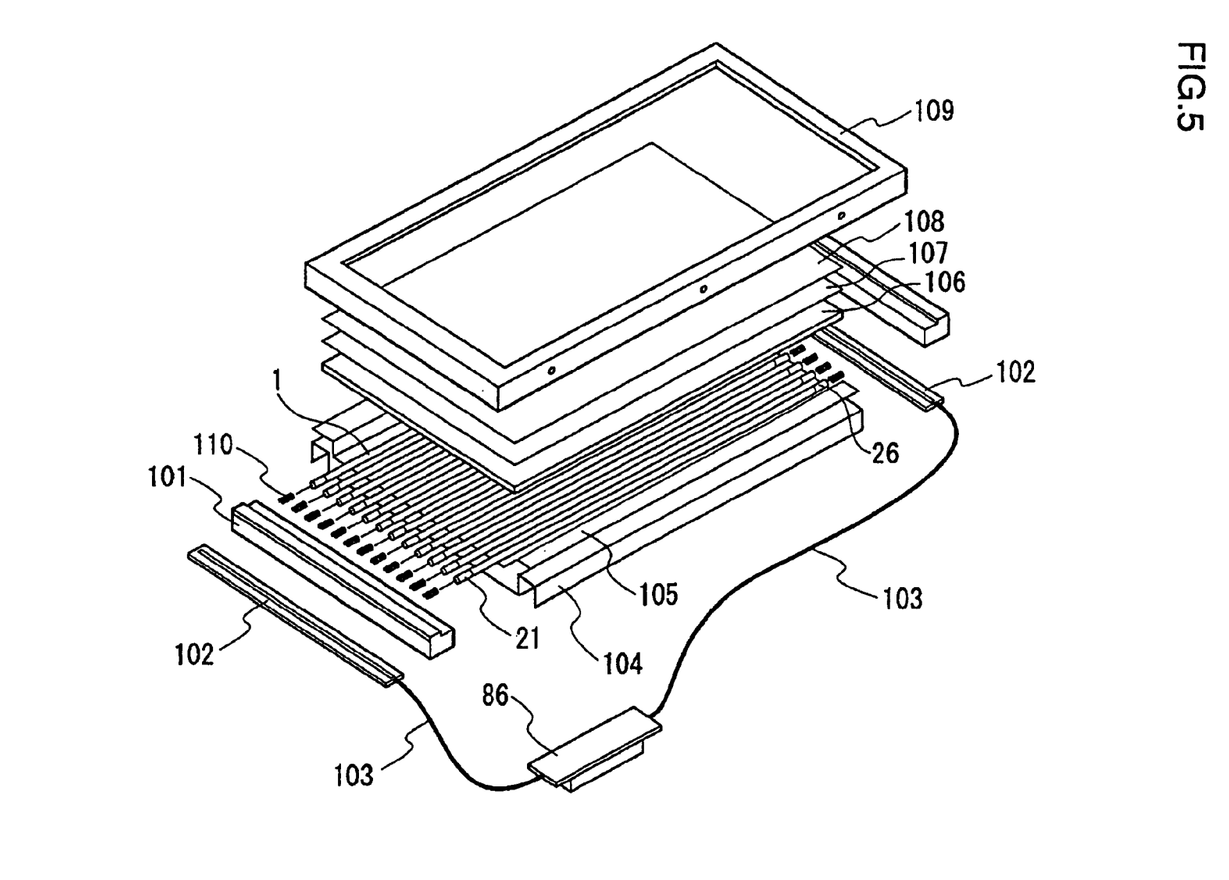
FIG. 5 is an exploded perspective view showing the illuminating device according to the second embodiment of the present invention.

Next, FIG. 5 is an exploded perspective view of an illuminating device, which is the second embodiment of the present invention. The illuminating device is a back light illuminating device, which lights a plurality of dielectric barrier discharge lamp 1 all at once and illuminates a liquid crystal panel from rear side. That is, this device includes twelve dielectric barrier discharge lamps 1 (hereinafter called EEFL) which are arranged in parallel, a side plate 101 for holding each ends of these EEFL 1, and a couple of relay boards 102 which connect each outer electrodes of EEFL 1. The device further includes an inverter 86, which is a high frequency power source, a harness 103, which supplies high frequency voltage to the both relay boards 102 from the inverter 86, lower frames 104, which fix the both side plates 101 and relay boards at a prescribed position, a reflecting plate 105, which reflects lights from a number of EEFL 1 to a prescribed direction, a diffusion plate 106 diffusion sheets 107, 108, which diffuse light from a number of EEFL 1 uniformly, and an upper frame 109. These various parts are arranged as shown in FIG. 5 and are building up a illuminating device.

Conductor springs 110 are attached on the outer electrodes 21, 26. These conductor springs are pressed by side plate 102 to contact with relay board 102. As the result, the electrostatic capacity of the electrode portion of each EEFL 1 can be made nearly equal with each other.

The inverter 86 has a circuit configuration shown in FIG. 2, and supplies the both relay boards 102 with high frequency sine wave voltages in accordance with the floating system. These voltages can supply a necessary and a sufficient tube current when the tube voltage of each EEFL 1 is equal to or lower than 2000 Vrms, and thus can obtain necessary and sufficient luminance characteristics.

For example, in a back light illuminating device having a picture size of 18 inch, the tube current of 5 mA is needed for an EEFL having both electrodes length of 10 mm. Taking the back light structure and the reactance component generated from the electrode length of EEFL 1 into consideration, the design requirement is satisfied by selecting the oscillating frequency of the sine wave output inverter 86 as 85 kHz and by selecting the tube voltage as 2000 Vrms, and thus the tube current of 5 mA is realized.

In the design of the back light illumination device according to the embodiment of the present invention, a necessary and sufficient tube current is selected for the aimed panel luminance. Taking the selected value of the tube current into consideration, the back light structure, the inverter, and the electrode length of the discharge lamp are selected so that the driving frequency may be confined in the range from 40 to 100 kHz, preferably in the range from 70 to 100 kHz. At this time, the drive frequency is adjusted so that the tube voltage may not exceed 2000 Vrms and the tube current is adjusted by varying the drive frequency.

Incidentally, it is possible for the sine wave output inverter 86 shown in the illuminating device according to the embodiment of the present invention to operate at higher frequency than the inverter using an ordinary transformer, by increasing a leakage inductance by decreasing a coupling between the primary side and the secondary side of the transformer and by decreasing the reactance component, which is fed back to the primary side from the secondary side including the back light unit.

According to the illuminating device described, each of EEFL 1 can be driven by a sine wave output inverter 86 with a tube voltage of 2000 Vrms or lower according to a floating system. As the result, generation of ozone is prevented, and aimed tube current to provide a desired luminance can be obtained.

Here, the reason why the oscillation frequency of the sine wave inverter 86 is especially preferable in the range 70 to 100 kHz is that the improvement of the driving efficiency of EEFL is remarkable in this range.

Next, the back light illumination device according to the third embodiment of the present invention is explained with reference to FIG. 6.

Compared with the illumination device shown in FIG. 5, the third embodiment is characterized in that the electrode portion for power supply is changed and an electrode made of electrically conductive silicone rubber 111 and a side plate 112 for supporting 111 are used instead of the side plate 101 and the relay board 102 of the back light unit of FIG. 5. That is, the back light illumination device includes a plurality of dielectric barrier discharge lamps (EEFL) 1 arranged in parallel, electrically conductive silicone rubber electrode 111, a side plate 112 for supporting and reinforcing the electrode 111, and an inverter 86 for supplying high frequency sine wave voltage.

Figure 6:
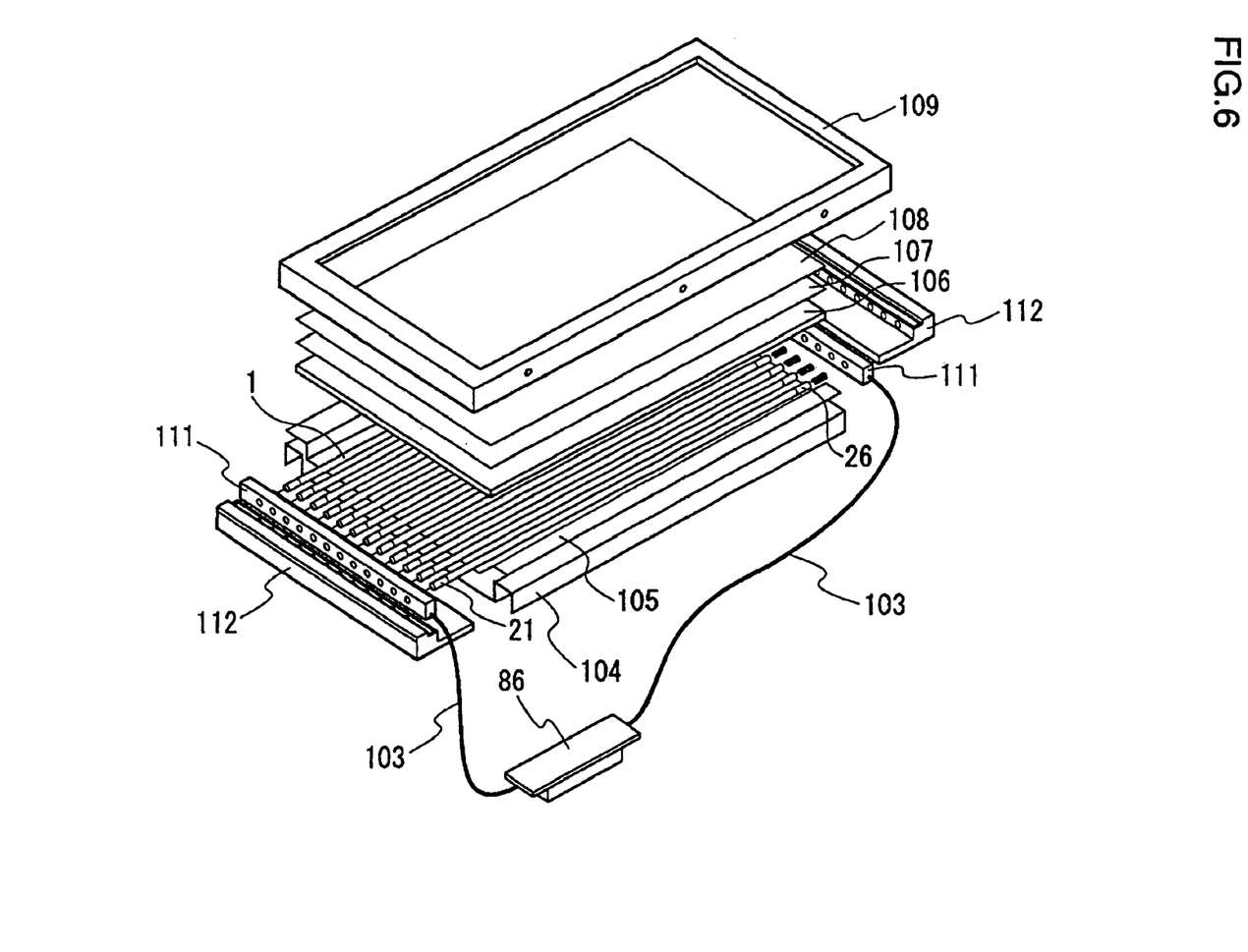
FIG. 6 is an exploded perspective view showing the illuminating device according to the third embodiment of the present invention.

More specifically, the back light illumination device further includes a couple of electrically conductive silicone rubber electrodes 111 which are arranged on the both sides of a plurality of dielectric barrier discharge lamps (EEFL) 1 arranged in parallel, a harness 103 for supplying these EEFL 1 with high frequency voltages from the inverter 86, a lower frame 104 for fixing side plates 112 on both side of the EEFL 1 at a predetermined position, a reflection plate 105 for reflecting an illuminated light from a plurality of EEFL 1 to a predetermined direction upwards in FIG. 6), a diffusion plate 106 for diffusing the illuminated light from EEFL 1 uniformly, and diffusion sheets 107, 108 for diffusing the illuminated light from EEFL 1 uniformly as well as the diffusion plate 106. Finally, providing an upper frame 109 on the parts piled, all the parts are assembled into one body.

The electrically conductive silicone rubber electrode 111 is made by mixing silicone rubber with carbon particles at a suitable ratio and by forming, having a soft rubber elasticity. A number of lamp inserting holes are provided on this electrically conductive silicone rubber electrode 111 at a constant space along the longitudinal direction. Outer electrodes 21, 26 provided on each ends of EEFL are pressed for inserting into each of these lamp-inserting holes. As the result, the outer electrodes 21, 26 electrically contact with electrically conductive silicone rubber 111 as well as they are supported mechanically.

With the structure, a number of EEFL 1 are connected in parallel by electrically conductive silicone rubber electrode 111, and are driven to light based on the similar principle to the illuminating device shown in FIG. 5. The inverter 86 is the floating system as shown in FIG. 2.

According to the embodiment, using the electrically conductive silicone rubber electrode 111 as a power supplying electrode, the positioning and assembling of the plurality of EEFL 1 become easy as well as the heat generated at the electrodes are distributed uniformly along the longitudinal direction of the electrically conductive silicone rubber electrode 111. Consequently, a phenomenon can be prevented that a hole is formed in the glass inside the outer electrodes 21, 26 by current concentration at the electrodes portion.

According to the present invention described, a dielectric barrier discharge lamp can be driven to light under the optimum condition.

Further according to the present invention, a plurality of dielectric barrier discharge lamps connected in parallel can be driven to light with high efficiency using only one lighting device with a high frequency sine wave voltage power source.

What is claimed is:

1. An illuminating device comprising:
   a dielectric barrier discharge type low pressure discharge lamp composed of a tubular glass lamp vessel, in which a discharge medium is enclosed,
   a first and a second electrode provided on an outer surface of both ends of the tubular glass lamp vessel, which are made of electrically conductive layer, and
   a lighting device which supplies a sine wave voltage between the first and the second electrodes of the dielectric barrier discharge type low pressure discharge lamp having a neutral point of the sine wave voltage being grounded,
   wherein the lighting device includes a high frequency power source of a floating output type, which outputs the sine wave voltage and which supplies a frequency in a range from 40 kHz to 100 kHz.

2. An illuminating device according to claim 1, wherein a plurality of dielectric barrier discharge type low pressure discharge lamps are connected in parallel with the high frequency power source.

3. An illuminating device according to claim 2, wherein the dielectric barrier discharge type low pressure discharge lamp contains mercury and rare gas as the discharge medium.

4. An illuminating device according to claim 3, wherein the lighting device drives the dielectric barrier discharge type low pressure discharge lamp at a tube voltage of 2000 Vrms or lower.

5. An illuminating device according to claim 4, wherein the high frequency power source further comprises;
   an inverter transformer having a primary winding which is provided on the input side of the transformer, a first and a second secondary windings, which are provided on the output side of the transformer each having one end being grounded in common, and a tertiary winding provided on the input side of the transformer,
   a resonance capacitor provided on the primary winding of the inverter transformer forming an LC resonance circuit with an inductance component of the primary winding, and
   a pair of transistors, emitter electrodes of which are grounded in common and are connected with the primary winding of the inverter transformer,
   wherein the other ends of the first and the second secondary windings of the inverter transformer are connected with the outer electrodes of the plurality of dielectric barrier discharge type low pressure discharge type low pressure discharge lamps.

6. An illuminating device according to claim 5, wherein the oscillation frequency of the high frequency power source is decided by a reactance of the primary winding of the inverter transformer, a combined reactance of a reactance of the tertiary winding and a reactance fed back from the secondary winding side, and a capacity of the resonance capacitor.

7. An illuminating device according to claim 6, wherein the oscillation frequency of the high frequency power source is decided by further taking a reactance component generated by the outer electrodes of the plurality of dielectric barrier discharge type low pressure discharge lamps into consideration.

8. An illuminating device according to claim 7, wherein the oscillation frequency of the high frequency power source is operated in high frequency by decreasing the reactance component fed back from the secondary side to the primary side of the inverter transformer by increasing a leakage inductance of the inverter transformer.

9. An illuminating device according to claim 5, wherein the lighting device is provided with an electrically conducting silicone rubber electrode as power supply electrodes for supplying the high frequency voltage from the lighting device by connecting each ends of the plurality of the dielectric barrier discharge type low pressure discharge lamps in parallel.

10. An illuminating device according to claim 1, wherein the frequency of the high frequency power source included in the lighting device is preferably selected as a frequency in a range from 70 to 100 kHz.

11. A lighting device for lighting a dielectric barrier discharge type low pressure discharge lamp having a tubular glass lamp vessel, in which a discharge medium is enclosed and a first and a second electrode provided on an outer surface of both ends of the tubular glass lamp vessel, which are made of electrically conductive layer, comprising:
    a high frequency power source for supplying a sine wave voltage between the first and the second electrodes of the dielectric barrier discharge type low pressure discharge lamp having a neutral point of the sine wave voltage being grounded, and
    power supply electrodes for supplying the high frequency voltage from the power source,
    wherein the high frequency power source is a floating output type, which supplies a frequency in a range from 40 kHz to 100 kHz.

12. A lighting device according to claim 11, wherein a plurality of dielectric barrier discharge type low pressure discharge lamps are connected in parallel with the high frequency power source.

13. A lighting device according to claim 12, wherein the dielectric barrier discharge type low pressure discharge lamp contains mercury and rare gas as the discharge medium.

14. A lighting device according to claim 13, wherein the lighting device drives the dielectric barrier discharge type low pressure discharge lamp at a tube voltage of 2000 Vrms or lower.

15. A lighting device according to claim 14, wherein the high frequency power source further comprises;
    an inverter transformer having a primary winding which is provided on the input side of the transformer, a first and a second secondary windings, which are provided on the output side of the transformer each having one end being grounded in common, and a tertiary winding provided on the input side of the transformer,
    a resonance capacitor provided on the primary winding of the inverter transformer forming an LC resonance circuit with an inductance component of the primary winding, and
    a pair of transistors, emitter electrodes of which are grounded in common and are connected with the primary winding of the inverter transformer,
    wherein the other ends of the first and the second secondary windings of the inverter transformer are connected with the outer electrodes of the plurality of dielectric barrier discharge type low pressure discharge type low pressure discharge lamps.

16. A lighting device according to claim 15, wherein the oscillation frequency of the high frequency power source is decided by a reactance of the primary winding of the inverter transformer, a combined reactance of a reactance of the tertiary winding and a reactance fed back from the secondary winding side, and a capacity of the resonance capacitor.

17. A lighting device according to claim 16, wherein the oscillation frequency of the high frequency power source is decided by further taking a reactance component generated by the outer electrodes of the plurality of dielectric barrier discharge type low pressure discharge lamps into consideration.

18. A lighting device according to claim 17, wherein the oscillation frequency of the high frequency power source is operated in high frequency by decreasing the reactance component fed back from the secondary side to the primary side of the inverter transformer by increasing a leakage inductance of the inverter transformer.

19. A lighting device according to claim 15, wherein the lighting device is provided with an electrically conducting silicone rubber electrode as power supply electrodes for supplying the high frequency voltage from the lighting device by connecting each ends of the plurality of the dielectric barrier discharge type low pressure discharge lamps in parallel.

* * * * *